United States Patent
Yao et al.

(10) Patent No.: US 10,862,740 B2
(45) Date of Patent: Dec. 8, 2020

(54) METHOD AND APPARATUS FOR SWITCHING SERVICE NODES IN A DISTRIBUTED STORAGE SYSTEM

(71) Applicant: Alibaba Group Holding Limited, Grand Cayman (KY)

(72) Inventors: Wenhui Yao, Hangzhou (CN); Junfeng Liu, Hangzhou (CN); Shuo Huang, Hangzhou (CN); Haiyong Zhang, Hangzhou (CN); Jiaji Zhu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 195 days.

(21) Appl. No.: 15/776,938

(22) PCT Filed: Dec. 8, 2016

(86) PCT No.: PCT/CN2016/107422
§ 371 (c)(1),
(2) Date: May 17, 2018

(87) PCT Pub. No.: WO2017/097130
PCT Pub. Date: Jun. 15, 2017

(65) Prior Publication Data
US 2018/0331888 A1    Nov. 15, 2018

(30) Foreign Application Priority Data
Dec. 8, 2015    (CN) .......................... 2015 1 0897877

(51) Int. Cl.
*H04L 12/24*    (2006.01)
*H04L 29/08*    (2006.01)
(Continued)

(52) U.S. Cl.
CPC ...... *H04L 41/0668* (2013.01); *H04L 43/0817* (2013.01); *H04L 67/1008* (2013.01);
(Continued)

(58) Field of Classification Search
CPC ............. H04L 41/0668; H04L 43/0817; H04L 67/1008; H04L 67/1034; H04L 67/1097; H04L 69/40
See application file for complete search history.

(56) References Cited

U.S. PATENT DOCUMENTS

| | | | |
|---|---|---|---|
| 5,159,691 A | 10/1992 | Fujita | |
| 6,194,969 B1 | 2/2001 | Doblar | |

(Continued)

FOREIGN PATENT DOCUMENTS

| | | |
|---|---|---|
| CN | 101217402 A | 7/2008 |
| CN | 101690136 A | 3/2010 |

(Continued)

OTHER PUBLICATIONS

International Search Report to corresponding International Application No. PCT/CN2016/107422 dated Feb. 7, 2017 (2 pages).
(Continued)

*Primary Examiner* — Nasser M Goodarzi
*Assistant Examiner* — Adil Ocak
(74) *Attorney, Agent, or Firm* — James J. DeCarlo; Greenberg Traurig, LLP

(57) ABSTRACT

Provided in the disclosed embodiments are methods and apparatuses for switching service nodes in a distributed storage system, the service nodes comprising a current service node and backup service nodes. The method comprises: monitoring response states of the service nodes to a service request; and if a response state of the current service node is abnormal, stopping communication between the current service node and the backup service nodes, and
(Continued)

triggering a switching process for the current service node. In the case of a service timeout, service unavailability, service abnormality, or the like caused by a hardware failure or software defect, logic is checked with a service node that performs logical determination and data statistics collection for multiple factors affecting response states of service nodes, thereby achieving autonomous switching and recovery of the service nodes and improving service availability.

20 Claims, 6 Drawing Sheets

(51) Int. Cl.
*H04L 29/14* (2006.01)
*H04L 12/26* (2006.01)

(52) U.S. Cl.
CPC ...... *H04L 67/1034* (2013.01); *H04L 67/1097* (2013.01); *H04L 69/40* (2013.01); *H04L 43/10* (2013.01)

(56) References Cited

U.S. PATENT DOCUMENTS

| | | | |
|---|---|---|---|
| 7,269,135 | B2 | 9/2007 | Frick et al. |
| 7,340,169 | B2 | 3/2008 | Ovadia et al. |
| 7,808,889 | B1 | 10/2010 | Howard |
| 7,836,234 | B2 | 11/2010 | Erdmenger et al. |
| 8,225,021 | B2 | 7/2012 | Adkins et al. |
| 8,521,200 | B2 | 8/2013 | Sättele |
| 8,570,898 | B1 | 10/2013 | Kopikare et al. |
| 8,660,059 | B2 | 2/2014 | Deng et al. |
| 9,344,494 | B2 | 5/2016 | Mordani et al. |
| 9,489,270 | B2 | 11/2016 | Anglin et al. |
| 9,760,529 | B1* | 9/2017 | Ho .................. G06F 9/4806 |
| 2005/0005200 | A1* | 1/2005 | Matena .............. G06F 9/5072 714/38.13 |
| 2005/0021751 | A1* | 1/2005 | Block ................... G06F 9/54 709/225 |
| 2008/0288686 | A1 | 11/2008 | Hikabe |
| 2009/0210879 | A1* | 8/2009 | Kaiser ................ G06F 9/4881 718/103 |
| 2010/0138531 | A1 | 6/2010 | Kashyap |
| 2012/0284429 | A1 | 11/2012 | Adkins et al. |
| 2013/0051220 | A1 | 2/2013 | Ryshakov |
| 2015/0261601 | A1 | 9/2015 | Madden et al. |

FOREIGN PATENT DOCUMENTS

| | | |
|---|---|---|
| CN | 101895447 A | 11/2010 |
| CN | 102231681 A | 11/2011 |
| CN | 102427412 A | 4/2012 |
| CN | 102521339 A | 6/2012 |

OTHER PUBLICATIONS

Examination Report to corresponding CN Application No. 201510897877.X dated Mar. 2, 2020 (5 pages).

* cited by examiner

METHOD AND APPARATUS FOR SWITCHING SERVICE NODES IN A DISTRIBUTED STORAGE SYSTEM

CROSS-REFERENCE TO RELATED APPLICATIONS

The present application claims priority to Chinese Patent Application No. 201510897877.X, filed on Dec. 8, 2015 and entitled "METHOD AND APPARATUS FOR SWITCHING SERVICE NODES IN DISTRIBUTED STORAGE SYSTEM," and PCT Appl. No. PCT/CN16/107422, filed on Nov. 28, 2016 and entitled "METHOD AND APPARATUS FOR SWITCHING SERVICE NODES IN DISTRIBUTED STORAGE SYSTEM," both of which are incorporated herein by reference in their entirety.

BACKGROUND

Technical Field

The disclosed embodiments relate to the field of Internet technologies, and in particular, to methods and apparatuses for switching service nodes in a distributed storage system.

Description of the Related Art

Current large-scale distributed storage systems mainly use centralized metadata management methods to perform the functions of centralized authority authentication and quota control. That is, these systems store metadata of all data in the entire system, in a centralized manner, on several metadata service nodes.

In this type of architecture, the availability of the metadata service nodes directly affects the availability of the entire system. Current systems thus improve the availability of the metadata service nodes through redundancy in the distributed storage system. Current systems employ two main methods for improving the availability of metadata service nodes at present. A metadata service (Name Node), for example, may perform switching to replace a current service node (Primary Node) in an abnormal state with a backup service node (Slave Node) through HA (High Availability). Alternatively, current systems may switch service nodes using a Paxos protocol as in, for example, an ALIBABA CLOUD APSARA distributed system and a PANGU file storage system.

In these two methods, a service node switching process is triggered only when a current service node cannot normally send a heartbeat acknowledgment to backup service nodes due to server breakdown, service process restart, network disconnection, or the similar circumstance. In other abnormal situations like single channel disconnection of a duplex network, partial network protocol abnormality, or slow disk response, the backup service nodes still treat the current service node as in a normal operating state and a service node switching process is not triggered due to a locking mechanism and a heartbeat mechanism.

However, a current service node in the abnormal state would actually cause problems such as timing out a response to a service request of a user, failing to provide complete metadata, or failing to store logs on a shared storage device, which affects the quality of the service provided by the current service node to the user. Current service node switching methods thus cannot restore the normal and stable metadata service accordingly. Therefore, current techniques for switching current service nodes have the low metadata service recovery efficiency performance which in turn leads to poor user experience.

SUMMARY

In view of the aforementioned problems, the disclosed embodiments are provided to provide a method for switching service nodes in a distributed storage system and a corresponding apparatus for switching service nodes in a distributed storage system so as to overcome or at least partially solve these art recognized problems.

To solve the aforementioned problems, the disclosed embodiments describe a method for switching service nodes in a distributed storage system, the service nodes comprising a current service node and backup service nodes, the method comprising: monitoring response states of the service nodes to a service request; and if a response state of the current service node is abnormal, stopping communication between the current service node and the backup service nodes, and triggering a switching process for the current service node.

Optionally, the method further comprises: if a response state of a certain service node is abnormal, adding an abnormal node flag to the service node for marking the service node not participating in the switching process for the current service node.

Optionally, the step of triggering a switching process for the current service node comprises: triggering selection of at least one service node not including the abnormal node flag as a new current service node to replace the current service node having the abnormal response state.

Optionally, the step of monitoring response states of the service nodes to a service request comprises: monitoring the response states of the service nodes to the service request through multithreading.

Optionally, the step of monitoring the response states of the service nodes to the service request through multithreading comprises: acquiring, through a first checking thread, a time point (T1) at which the service node last fetches the service request from a service request queue, and using a time interval (D1) between a current time point (N1) and the time point (T1) as a response time; and determining whether the response time is greater than a first preset response time threshold; and if so, determining that the response state of the service node is abnormal.

Optionally, the step of monitoring the response states of the service nodes to the service request through multithreading comprises: determining whether a storage unit of the service node includes a storage response timeout flag through a second checking thread; and if so, using a time interval (D2) between a flag-adding time point (T2) corresponding to the storage response timeout flag and a current time point (N2) as the response time; and if the response time is greater than a second preset response time threshold, determining that the response state of the service node is abnormal.

Optionally, before the step of monitoring the response states of the service nodes to the service request through multithreading, the method further comprises: acquiring start and end times of log writing of the storage unit of the service node through a log recording thread, and using a time interval between the start and end times as a storage unit response time; and determining whether the storage unit response time is greater than a third preset response time threshold; and if so, adding the storage response timeout flag to the storage unit and recording a time point (T2) when the flag is added accordingly.

Optionally, the method further comprises: if the storage unit response time is less than the third preset response time threshold and the storage unit already includes the storage response timeout flag, deleting the storage response timeout flag.

Optionally, before the step of monitoring response states of the service nodes to a service request, the method further comprises: registering a monitoring result of at least one of the service nodes into a monitoring result registration list; and the step of monitoring response states of the service nodes to a service request comprises: polling registered monitoring results at a start position of the monitoring result registration list.

Optionally, the method further comprises: using a result obtained by dividing the number of the multithreading by the preset response time threshold as a frequency of monitoring the response states of the service nodes.

To solve the aforementioned problem, the disclosed embodiments further describe an apparatus for switching service nodes in a distributed storage system, the service nodes comprising a current service node and backup service nodes, the apparatus comprising: a service node response state monitoring module, configured to monitor response states of the service nodes to a service request; and a current service node switching triggering module, configured to do the following: if a response state of the current service node is abnormal, stop communication between the current service node and the backup service nodes, and trigger a switching process for the current service node.

Optionally, the apparatus further comprises: an abnormal node flag adding module, configured to do the following: if a response state of a certain service node is abnormal, add an abnormal node flag to the service node for marking the service node not participating in the switching process for the current service node.

Optionally, the current service node switching triggering module comprises: a selection triggering submodule, configured to trigger selection of at least one service node not including the abnormal node flag as a new current service node to replace the current service node having the abnormal response state.

Optionally, the service node response state monitoring module comprises: a multithread monitoring submodule, configured to monitor the response states of the service nodes to the service request through multithreading.

Optionally, the multithread monitoring submodule comprises: a first checking thread subunit, configured to acquire, through a first checking thread, a time point (T1) at which the service node last fetches the service request from a service request queue, and use a time interval (D1) between a current time point (N1) and the time point (T1) as a response time; and a first preset response time threshold determining subunit, configured to determine whether the response time is greater than a first preset response time threshold; and if so, determine that the response state of the service node is abnormal.

Optionally, the multithread monitoring submodule comprises: a second checking thread subunit, configured to determine whether a storage unit of the service node includes a storage response timeout flag through a second checking thread; and if so, invoke a second preset response time threshold determining subunit; and the second preset response time threshold determining subunit, configured to use a time interval (D2) between a flag being added a time point (T2) corresponding to the storage response timeout flag and a current time point (N2) as the response time; and if the response time is greater than a second preset response time threshold, determining that the response state of the service node is abnormal.

Optionally, the apparatus further comprises: a storage unit response time determining module, configured to acquire start and end times of log writing of the storage unit of the service node through a log recording thread, and use a time interval between the start and end times as a storage unit response time; and a storage response timeout flag adding module, configured to determine whether the storage unit response time is greater than a third preset response time threshold; and if so, add the storage response timeout flag to the storage unit and record a time point (T2) when the flag is added accordingly.

Optionally, the apparatus further comprises: a storage response timeout flag deleting module, configured to do the following: if the storage unit response time is less than the third preset response time threshold and the storage unit already includes the storage response timeout flag, delete the storage response timeout flag.

Optionally, the apparatus further comprises: a monitoring result registering module, configured to register a monitoring result of at least one of the service nodes into a monitoring result registration list; and the service node response state monitoring module comprises: a monitoring result polling submodule, configured to poll registered monitoring results at a start position of the monitoring result registration list.

Optionally, the apparatus further comprises: a monitoring frequency determining module, configured to use a result obtained by dividing the number of the multithreading by the preset response time threshold as a frequency of monitoring the response states of the service nodes.

The disclosed embodiments have the following advantages.

In the disclosed embodiments, response states of service nodes to a service request are monitored; and for a current service node having an abnormal response state, communication between the current service node and backup service nodes is stopped, thus triggering a switching process for the current service node. In the case of a service timeout, service unavailability, service abnormality, or the like caused by a hardware failure or software defect, logic is checked with a service node that performs logical determination and data statistics collection for multiple factors affecting response states of service nodes, thereby achieving autonomous switching and recovery of the service nodes and improving service availability. Further, the service recovery efficiency is enhanced which in turns improves the user experience.

Secondly, in the disclosed embodiments, one or more factors affecting response states of service nodes can be monitored. The multidimensional monitoring improves the comprehensiveness and scalability of service recovery.

Further, in the disclosed embodiments, an abnormal current service node is not directly initialized. Instead, a relative conservative measure is taken by stopping the current service node from communicating with backup service nodes to trigger service node switching. When a misdiagnosis incident happens, the current service node that is misdiagnosed as having the abnormal response state may then serve as a new current service node again and continuing providing the service, thereby preventing any negative influence the misdiagnosis may have on the entire system.

Additionally, in the disclosed embodiments, an abnormal node flag is added to the service node having an abnormal response state, which avoids the problem of the service node having the abnormal response state being selected as a current service node, thereby achieving the goal of service node switching. Moreover, since the abnormal service node is excluded, the service node switching process can ensure the stability of the new current service node, avoiding system fluctuation caused by repeated service node switching, and improving the stability of service recovery.

DETAILED DESCRIPTION OF THE EMBODIMENTS

Figure 1:
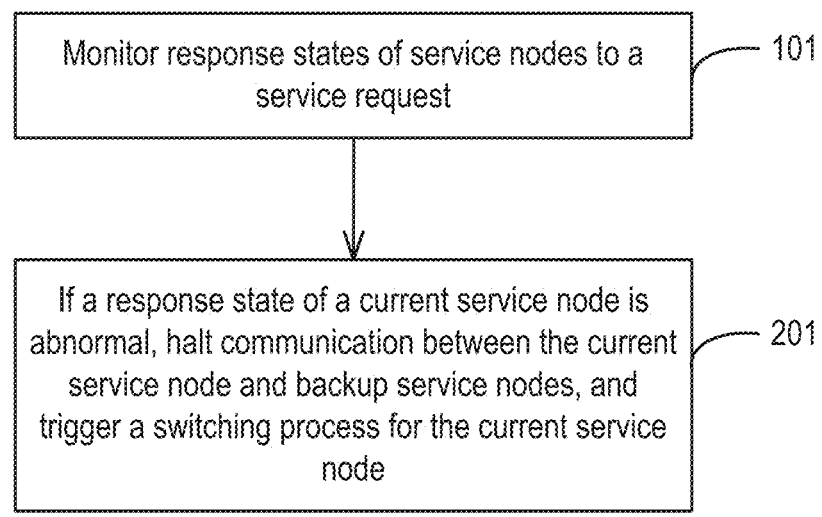
FIG. 1 is a flow diagram illustrating a method for switching service nodes in a distributed storage system according to some embodiments of the disclosure.

To make the objects, features, and advantages of the disclosed embodiments more obvious and easy to understand, the disclosed embodiments are further described below in detail in conjunction with the accompanying figures and the specific implementations.

Regarding a commonly-used method for improving the availability of metadata service nodes, a metadata service may perform switching to replace a current service node in an abnormal state with a backup service node in a system, for example, a Hadoop distributed file system. Specifically, through a distributed lock service, a service node obtaining a distributed lock serves as a current service node, the current service node provides and stores generated logs on a shared storage device; and other backup service nodes do not provide the metadata service but read logs from the shared storage device only and apply them to the memory to keep the memory synchronized and consistent with the current service node. The backup service node randomly detects the state of the lock; and when the lock is released, it indicates that the current service node is in an abnormal state such as server breakdown, service process restart, or network disconnection. The backup service node then acquires the distributed lock and is upgraded into the new current service node that provides the metadata service.

In another common method for improving availability, multiple backup service nodes perform current service node election through a Paxos protocol to generate therefrom a current service node providing a metadata service. A user requests the metadata service from the current service node. The current service node makes a response and then generates a log, stores it locally and sends it to all backup service nodes. After receiving the log, the backup service nodes store the log locally and apply it to the memory to maintain synchronized and consistent with the current service node. Meanwhile, the current service node may send heartbeat acknowledgment information to the backup service nodes during normal operation. The backup service nodes confirm that the current service node stays active through a heartbeat mechanism. If the current service node has an abnormality such as server breakdown, service process restart, or network disconnection, the current service node will not be able to send heartbeat acknowledgment information to the backup service nodes. The backup service nodes thus initiate a switching process for the current service node; and a new current service node is chosen from the backup service nodes to provide the metadata service.

In the current methods for improving the availability of metadata service nodes discussed above, the triggering of service node switching only happens when a serious faulty situation occurs that causes the current service node to be unable to fully operate. Triggering of service node switching, on the other hand, will not happen if an abnormal state is caused by some other faulty situation like a slow response of the current service node. Nevertheless, the current service node in the abnormal state already affects the quality of the service provided to the user.

Therefore, the current service node switching methods have the low metadata service recovery efficiency problem which in turn leads to poor user experience. Moreover, according to the current service node switching methods, even if the service node switching process is triggered, it is possible to switch back to the service node already in the abnormal state, and thus the purpose of service node switching cannot be achieved, affecting the metadata service recovery efficiency. To solve the problems with existing systems, several embodiments of a service node switching method are provided below.

FIG. 1 illustrates a flow diagram illustrating a method for switching service nodes in a distributed storage system according to some embodiments of the disclosure. The service nodes include a current service node and backup service nodes. The method may specifically include the following steps.

Step 101: Monitor response states of the service nodes to a service request.

It should be noted that the service nodes may be service nodes providing a metadata service. Metadata is data about data that describes information about data properties and supports functions such as indicating storage locations, historical data, resource search, and file recording.

In one embodiment, several checking threads may be correspondingly initialized in the system for different checkpoints to monitor whether response states of the service nodes are abnormal. For example, a first checking thread analyzing an abnormality of a service request queue response time is set up while a second checking thread analyzing an abnormality of a storage unit response time is set up.

It should be noted that whether a response time is abnormal may be determined by comparing it with a preset response time threshold. For example, the response time threshold may be preset to 10 seconds. If a response time of a service node to a certain service request in a service request queue exceeds 10 seconds (or a response time of a storage unit of the service node performing log reading and writing exceeds 10 seconds), it may be determined that the service node has an abnormal response state. In this example, a user would need to wait for a longer time for the requested service to be responded and a service node might not even be able to provide normal services, which in turn affects user experience.

In one embodiment, the method may monitor response states of the service nodes to the service request via multithreading. Because in actual applications, multiple factors may affect response states of the service nodes, those skilled in the art can set up multiple checking threads according to the actual situation to monitor the response states of the service nodes to the service request. A checking thread analyzing whether the storage unit is nearly fully loaded, for example, may also be set up.

Preferably, the checking threads for monitoring the service nodes may not have the ability to execute operations but are only used for logical determination and data statistics collection for checking response states. The checking threads should be as lightweight as possible and avoid performing processing work requiring a large amount of computation work and consuming a lot of time. For example, the checking threads may not perform RPC (Remote Procedure Call Protocol) operations or long-time lock waiting operations. Such operations may cause a serious delay or even failure of effective execution of a subsequent service node switching process, and may finally cause the entire checking mechanism to be ineffective.

Step 102: If a response state of the current service node is abnormal, halt communication between the current service node and the backup service nodes, and trigger a switching process for the current service node.

In one embodiment, whether the response states of the current service node and the backup service nodes are abnormal may be determined by monitoring the response states of the service nodes. Corresponding operations may be performed for different monitoring results of different service nodes. For a current service node having the abnormal response state, communication between the current service node and multiple backup service nodes may be stopped.

There may be many methods for stopping mutual communication. For example, heartbeat acknowledgment between the current service node and the backup service nodes may be stopped. When the backup service nodes have not received heartbeat acknowledgment information sent by the current service node for more than a certain period, the service nodes may determine that the current service node is in an abnormal state and not functioning. A switching process for the current service node then needs to be initiated.

When the backup service nodes cannot normally communicate with the current service node, the backup service nodes may determine that the current service node is in an abnormal state; thus a selection operation for a new current service node is triggered. The new current service node is used to replace the abnormal service node. The switching process for the current service node is then completed. The selection operation for the current service node may be done through a Paxos protocol.

In actual applications, other methods may also be used to trigger the switching process for the current service node. For example, a distributed lock service is used. If the current service node is in an abnormal state and not functioning, the backup service nodes trigger the current service node to release of a lock. The multiple backup service nodes perform a lock-securing operation. The backup service node obtaining the lock is used to replace the abnormal current service node to complete the switching process for the current service node.

An abnormal node flag may also be added to the current service node and backup service nodes having abnormal response states. The service nodes carrying the flag will not be selected or switched to for being the new current service node in the service node switching process, which avoids the problem of the service node having the abnormal response state being selected as a current service node, thereby achieving the goal of service node switching.

As one example of this embodiment, a monitoring result of at least one of the service nodes may be registered into a monitoring result registration list. Registered monitoring results are then polled at a start position of the monitoring result registration list.

In actual applications, a checking point execution module may be set to perform corresponding operations for different monitoring results. Various checking threads can generate monitoring results during the system start and register the monitoring results into a monitoring result registration list of the checking point execution module. The checking point execution module may be a system background thread, which may poll the monitoring results one by one at a start position of the registration list, and perform corresponding processing according to the monitoring results. For example, in a certain monitoring result, the first checking thread determines that a response state of the current service node is abnormal according to a response time of service request processing; and the checking point execution module thus may stop the current service node from sending heartbeat acknowledgment information to backup service nodes and add an abnormal node flag to the current service node. As another example, in another monitoring result, the second checking thread determines that a response state of a backup service node is abnormal according to a timeout of log reading and writing of the storage unit, and the checking point execution module thus adds an abnormal node flag to the backup service node.

It should be noted that the checking point execution module may not need to focus on how logical determination of each checking thread is implemented. That is, the checking point execution module does not need to focus on how the checking thread specifically monitors the service node to see whether it is abnormal. Instead, what suffices is for the checking point execution module to simply focus on whether a response state of the service node reflected by a monitoring result is abnormal. Specifically, whether the response state of the service node is abnormal may be represented by True and False values, and the checking thread may only register a True or False value as a monitoring result into the registration list of the checking point execution module.

Additionally, a result obtained by dividing the number of threads by the preset response time threshold may be used as a frequency of monitoring the response states of the service nodes.

In actual applications, if the monitoring frequency is excessively low, monitoring results reflecting abnormal service nodes may not be noticed, which cannot ensure in-time switching when the current service node is abnormal. Therefore, to improve checking accuracy, a monitoring execution interval cannot be greater than a preset response time threshold set for any checking thread to determine whether response states are abnormal. For example, if the preset response time threshold is 10 seconds, the execution interval of monitoring may be set to 1 second. For ease of determining the monitoring frequency, the preset response time threshold may be divided by the number of the checking threads for monitoring, and the result is used as the monitoring frequency. For example, the number of the checking threads is 10 and the preset response time threshold is 10 seconds; then, the monitoring frequency is 1 per second. That is, the checking point execution module may retrieve one monitoring result from the monitoring result registration list every one second to perform corresponding processing.

Based on the actual situation, those skilled in the art may apply the methods provided in these embodiments to various distributed file systems and computing and storage platforms, such as an HDFS (Hadoop Distributed Filesystem) system, an ODPS (Open Data Processing Service) computing platform, an OSS (Object Storage Service) storage platform, an OTS (Open Table Service) storage platform, or an ECS (Elastic Compute Service) computing platform.

Compared with the current service node switching methods, response states of service nodes to a service request are monitored in the disclosed embodiments. For a current service node having an abnormal response state, communication between the current service node and backup service nodes is stopped, thus triggering a switching process for the current service node. In the case of a service timeout, service unavailability, service abnormality, or the like caused by a hardware failure or software defect, logic is checked with a service node that performs logical determination and data statistics collection for multiple factors affecting response states of service nodes, thereby achieving autonomous switching and recovery of the service nodes and improving service availability. Further, the service recovery efficiency is enhanced which in turns improves the user experience.

Secondly, in the disclosed embodiments, one or more factors affecting response states of service nodes can be monitored. The multidimensional monitoring improves the comprehensiveness and scalability of service recovery.

Further, in the disclosed embodiments, an abnormal current service node is not initialized directly. Instead, a relative conservative measure is taken by stopping the current service node from communicating with backup service nodes to trigger service node switching. When a misdiagnosis incident happens, the current service node that is misdiagnosed as having the abnormal response state may then serve as a new current service node again and continuing providing the service, thereby preventing any negative influence the misdiagnosis may have on the entire system.

Figure 2:
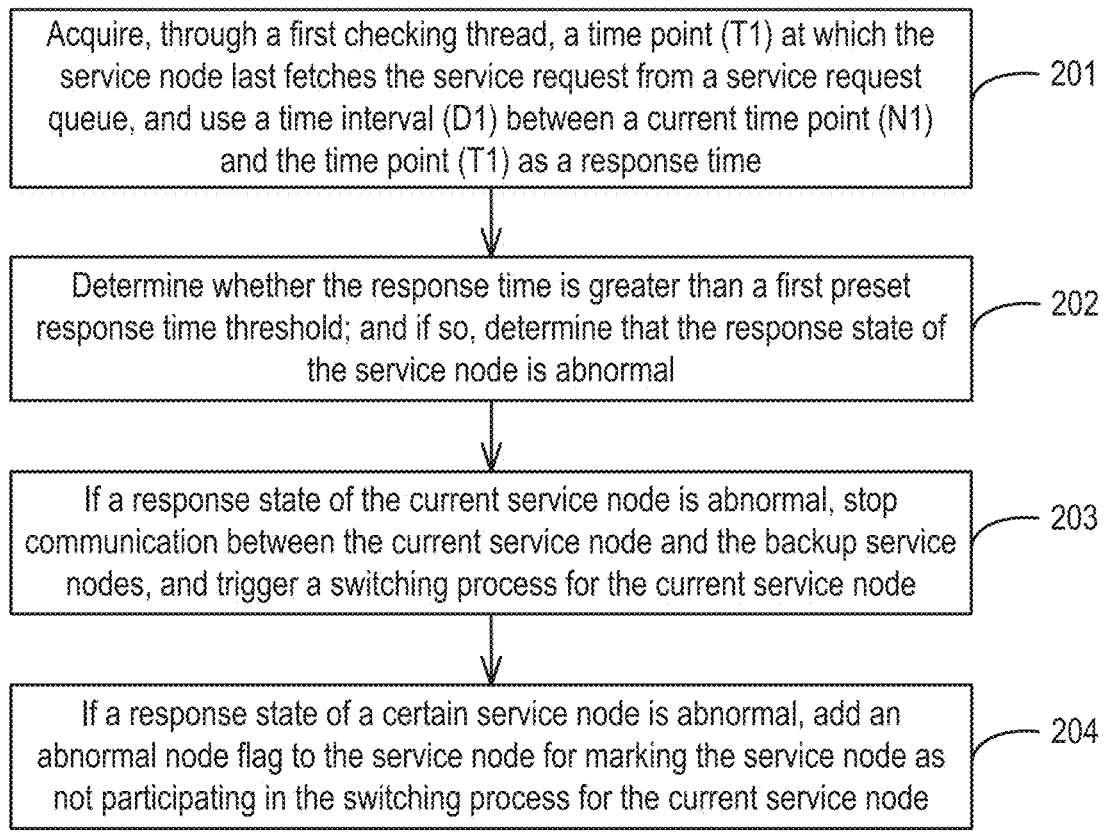
FIG. 2 is a flow diagram illustrating a method for switching service nodes in a distributed storage system according to some embodiments of the disclosure.

FIG. 2 is a flow diagram illustrating a method for switching service nodes in a distributed storage system according to some embodiments of the disclosure. The service nodes include a current service node and backup service nodes. The method may specifically include the following steps.

Step 201: Acquire, through a first checking thread, a time point (T1) at which the service node last fetches the service request from a service request queue and use a time interval (D1) between a current time point (N1) and the time point (T1) as a response time.

In one embodiment, the first checking thread comprises a checking thread analyzing whether a service request queue response time is abnormal. When a user submits a service request to the current service node, the service request may be placed in the service request queue, each waiting to be processed by the current service node. When the current service node fetches the service request from the queue, the time point (T1) at this time may be recorded.

The first checking thread may check the service request queue regularly. When a service request awaiting processing exists in the service request queue, the first checking thread acquires the previously recorded time point (T1) at which the service request was last fetched, and uses a time interval (D1) between the current time point (N1) and T1 as a response time of the current service node.

Step 202: Determine whether the response time is greater than a first preset response time threshold; and if so, determine that the response state of the service node is abnormal.

The response time may be compared with a first preset response time threshold. If the response time is greater than the first preset response time threshold, it indicates that the current service node is behind the schedule when processing the service request of the user, causing a long wait time of the user for the service. Therefore, regardless of whether the current service node is functioning normally in other aspects, the response state of the current service node may be considered abnormal.

As one example, the first preset response time threshold may be set to 10 seconds. That is, if the service request submitted by the user is not successfully responded to within 10 seconds, it may be determined that the response state of the current service node is abnormal. Certainly, those skilled in the art may set the first preset response time threshold according to the needs of the monitored system, which are not limited by the disclosed embodiments.

The first checking thread may register a monitoring result indicating the abnormal or normal response state into a monitoring result registration list of a checking point execution module. The checking point execution module performs corresponding processing according to the monitoring result.

Step 203: If a response state of the current service node is abnormal, stop communication between the current service node and the backup service nodes, and trigger a switching process for the current service node.

Step 204: If a response state of a certain service node is abnormal, add an abnormal node flag to the service node for marking the service node not participating in the switching process for the current service node.

For the current service node having the abnormal response state, the checking point execution module may stop communication between the current service node and multiple backup service nodes. An abnormal node flag may also be added to the current service node and backup service nodes having abnormal response states. The service nodes including the flag will not be selected or switched to when selecting the new current service node in the service node switching process.

In one embodiment, the step of triggering a switching process for the current service node may include: triggering selection of at least one service node (not including the abnormal node flag) as a new current service node to replace the current service node having the abnormal response state.

As one example, if the current service node is selected through a Paxos protocol, the service nodes including the abnormal node flag will not participate in the selection. When the backup service nodes trigger the switching process for the current service node, the service nodes including the abnormal node flag do not participate in the selection and will not be selected as the new current service node. If service node switching is performed through a distributed lock service, the service nodes including the abnormal node flag will not perform a lock-securing operation. Only normal service nodes participate in the lock-securing process.

In the disclosed embodiments, an abnormal node flag is added to the service node having an abnormal response state, which avoids the problem of the service node having the abnormal response state being selected as a current service node, thereby achieving the goal of service node switching. Moreover, since the abnormal service node is excluded, the service node switching process can ensure the stability of the new current service node, avoiding system fluctuation caused by repeated service node switching, and improving the stability of service recovery.

Figure 3:
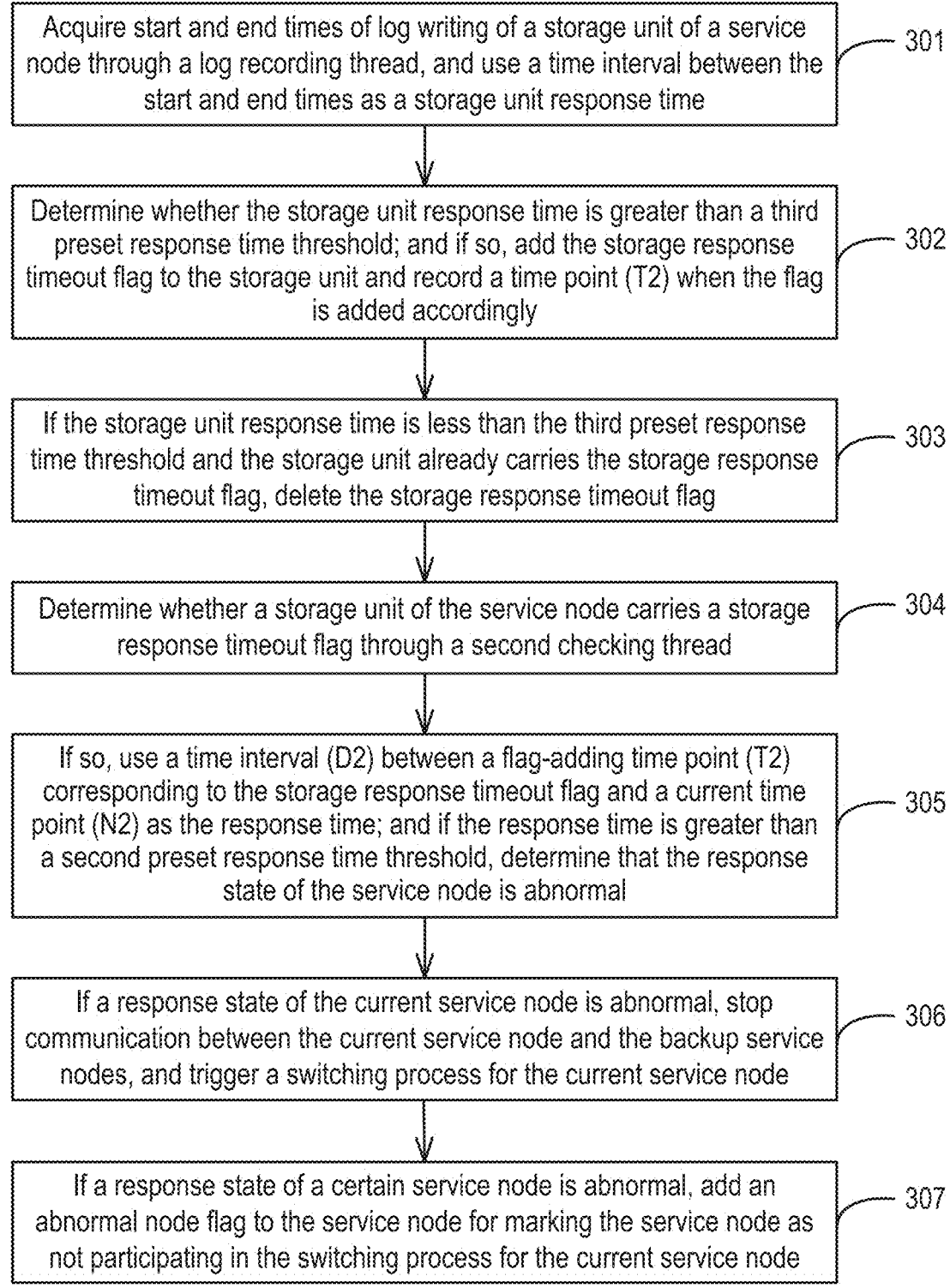
FIG. 3 is a flow diagram illustrating a method for switching service nodes in a distributed storage system according to some embodiments of the disclosure.

FIG. 3 is a flow diagram illustrating a method for switching service nodes in a distributed storage system according to some embodiments of the disclosure. The service nodes include a current service node and backup service nodes. The method may specifically include the following steps.

Step 301: Acquire start and end times of log writing of a storage unit of a service node through a log recording thread, and use a time interval between the start and end times as a storage unit response time.

It should be noted that a log is generated when a user submits a service request. The current service node and the backup service nodes all need to record the log into storage units through a log recording thread and then return a notification indicating successful processing of the service request of the user. Therefore, the response time of the storage units directly affects the response time to the service request.

In one embodiment, the log recording thread records a start time point at which the service node starts log writing and an end time point at which log writing is completed. A time interval between the start and end time points is used as a storage unit response time.

Step 302: Determine whether the storage unit response time is greater than a third preset response time threshold; and if so, add the storage response timeout flag to the storage unit and record a time point (T2) when the flag is added accordingly.

It is determined whether the storage unit response time is greater than a third preset response time threshold; and if so, it indicates that the storage unit of the service node is abnormal. Then a storage response timeout flag may be added to the storage unit and a time point (T2) of adding the flag is recorded. If the storage unit of the service node already includes the storage response timeout flag, the flag adding process may not need to be performed.

Step 303: If the storage unit response time is less than the third preset response time threshold and the storage unit already includes the storage response timeout flag, delete the storage response timeout flag.

As one example, a checking thread needs to focus on the abnormal situation where the storage unit continues to respond slowly. A single slow response of the storage unit may be caused accidentally and may be ignored temporarily to avoid a false negative. Therefore, if the storage unit response time is less than the third preset response time threshold and the storage response timeout flag is already included, the flag may be deleted.

Step 304: Determine whether a storage unit of the service node includes a storage response timeout flag through a second checking thread.

Step 305: If so, use a time interval (D2) between a flag-adding time point (T2) corresponding to the storage response timeout flag and a current time point (N2) as the response time; and if the response time is greater than a second preset response time threshold, determine that the response state of the service node is abnormal.

The second checking thread may determine whether the storage unit includes the storage response timeout flag, and perform a corresponding processing according to a determination result.

If the storage response timeout flag is included, an adding time point (T2) of the flag is acquired from the log recording thread and is subtracted from a current time point (N2) to obtain a time interval (D2) to serve as a response time of the service node. If the response time is greater than a second preset response time threshold, it indicates that the service node records the log in the storage unit for an excessively long time, which affects the response time to the service request. Therefore, regardless of whether the current service node is functioning normally in other aspects, the response state of the current service node may be considered abnormal.

The second checking thread registers a monitoring result indicating the abnormal or normal response state into a monitoring result registration list of a checking point execution module; and the checking point execution module performs corresponding processing according to the monitoring result. For example, the second checking thread determines that the response time of the storage unit is not shorter than 30 milliseconds within 30 seconds. Then it can be determined that the storage unit of the service node is abnormal, which causes the abnormal response state of the service node.

Step 306: If a response state of the current service node is abnormal, stop communication between the current service node and the backup service nodes, and trigger a switching process for the current service node.

Step 307: If a response state of a certain service node is abnormal, add an abnormal node flag to the service node for marking the service node not participating in the switching process for the current service node.

For the current service node having the abnormal response state, the checking point execution module may stop communication between the current service node and multiple backup service nodes. An abnormal node flag may also be added to the current service node and backup service nodes having abnormal response states. The service nodes including the flag will not be selected or switched to for being the new current service node in the service node switching process.

It should be noted that step 301 to step 303 may be performed cyclically to repeatedly compute and compare response time of log writing of a storage unit and aiming to determine whether an abnormal situation where the storage unit continues to respond slowly; and update a storage response timeout flag of the storage unit accordingly, so that the second checking thread can perform corresponding processing according to the flag.

It should be noted that to briefly describe the method embodiments, these embodiments are expressed as a combination of a series of actions. Those skilled in the art should know that the disclosed embodiments are not limited by the sequence of the described actions. Certain steps can be applied with different sequences or can be performed at the same time according to the disclosed embodiments. Secondly, those skilled in the art should also know that all the embodiments described in the description belong to exemplary embodiments; the related actions are not necessarily needed for the disclosed embodiments.

Figure 4:
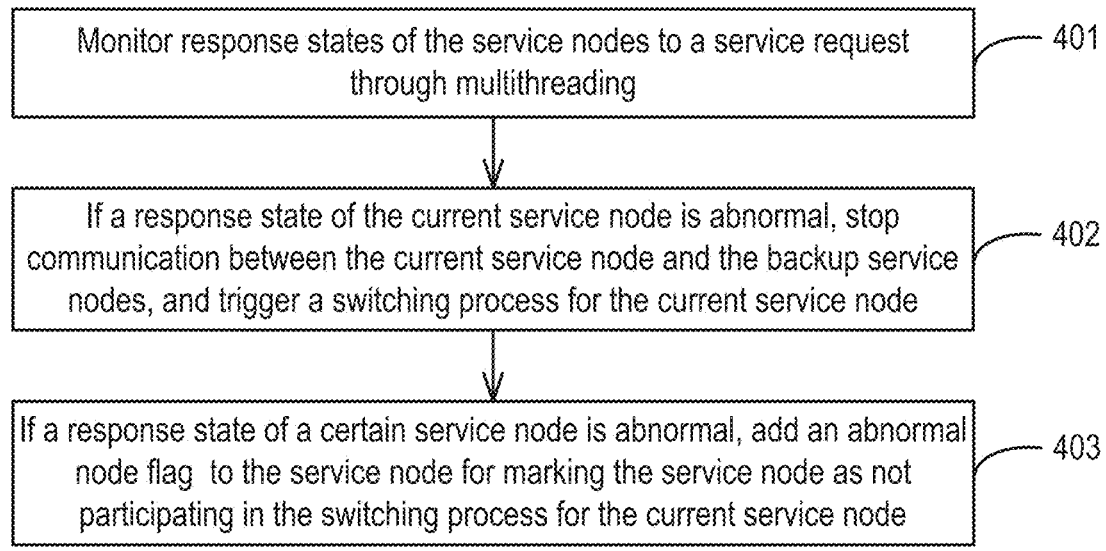
FIG. 4 is a flow diagram illustrating a method for switching service nodes in a distributed storage system according to some embodiments of the disclosure.

FIG. 4 is a flow diagram illustrating a method for switching service nodes in a distributed storage system according to some embodiments of the disclosure. The service nodes include a current service node and backup service nodes. The method may specifically include the following steps.

Step 401: Monitor the response states of the service nodes to the service request through multithreading.

Whether response states of the service nodes to a service request are abnormal may be monitored through multiple checking threads analyzing issues in different aspects of the service nodes. As one example, the response states of the service nodes may be affected by multiple factors. The targeted monitoring can be performed regardless of whether a single factor or a combined action of multiple factors affects the response states of the service nodes. Therefore, to monitor the service nodes more comprehensively and flexibly, the service nodes can be monitored through a combination of multiple threads. Certainly, the number of the threads and the specific combination mode of the threads may be determined by those skilled in the art according to actual system needs.

As one example of this embodiment, the step 401 may specifically include the following sub-steps.

Sub-step S11: Acquire, through a first checking thread, a time point (T1) at which the service node last fetches the service request from a service request queue, and use a time interval (D1) between a current time point (N1) and the time point (T1) as a response time.

Sub-step S12: Determine whether the response time is greater than a first preset response time threshold; and if so, determine that the response state of the service node is abnormal.

Sub-step S13: Determine whether a storage unit of the service node includes a storage response timeout flag through a second checking thread.

Sub-step S14: If so, use a time interval (D2) between a flag-adding time point (T2) corresponding to the storage response timeout flag and a current time point (N2) as the response time; and if the response time is greater than a second preset response time threshold, determine that the response state of the service node is abnormal.

The aforementioned first checking thread may be a thread analyzing whether a service request queue response time is abnormal. The service nodes are monitored through the first checking thread, so that an abnormality of a service node caused by an excessively slow response time of the service request queue can be monitored. The aforementioned second checking thread may be a thread analyzing whether a storage unit response time is abnormal. The service nodes are monitored through the second checking thread, so that an abnormality of a service node caused by excessively slow log writing of the storage unit can be monitored. It should be noted that the aforementioned sub-steps do not have a particular order. That is, monitoring can be performed through the first checking thread and the second checking thread simultaneously.

Step 402: If a response state of the current service node is abnormal, stop communication between the current service node and the backup service nodes, and trigger a switching process for the current service node.

Step 403: If a response state of a certain service node is abnormal, add an abnormal node flag to the service node for marking the service node not participating in the switching process for the current service node.

Response states of service nodes to a service request are monitored through the aforementioned first checking thread and second checking thread simultaneously. Monitoring can be performed for both the response times of a service request queue and log writing of a storage unit simultaneously. When either of them is found to have issues, a service node switching process can be triggered and an abnormal node flag can be added directly. In this way, the comprehensiveness and scalability of service recovery are improved through a multidimensional monitoring means.

Figure 5:
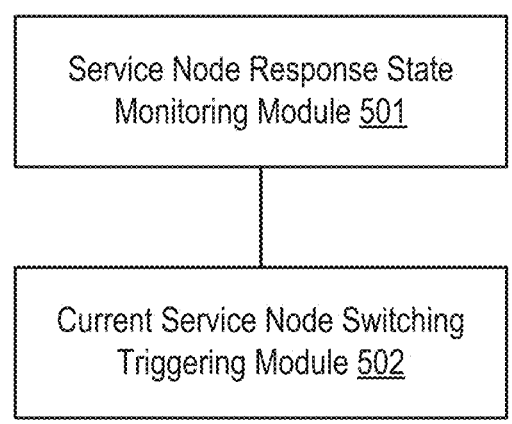
FIG. 5 is a block diagram of an apparatus for switching service nodes in a distributed storage system according to some embodiments of the disclosure.

FIG. 5 is a block diagram of an apparatus for switching service nodes in a distributed storage system according to some embodiments of the disclosure. The service nodes include a current service node and backup service nodes. The apparatus may specifically include the following modules.

A service node response state monitoring module 501 is configured to monitor response states of the service nodes to a service request.

A current service node switching triggering module 502 is configured to do the following: if a response state of the current service node is abnormal, stop communication between the current service node and the backup service nodes, and trigger a switching process for the current service node.

In the disclosed embodiments, response states of service nodes to a service request are monitored; and for a current service node having an abnormal response state, communication between the current service node and backup service nodes is stopped, thus triggering a switching process for the current service node. In the case of a service timeout, service unavailability, service abnormality, or the like caused by a hardware failure or software defect, logic is checked with a service node that performs logical determination and data statistics collection for multiple factors affecting response states of service nodes, thereby achieving autonomous switching and recovery of the service nodes and improving service availability. Further, the service recovery efficiency is enhanced which in turns improves the user experience.

Secondly, in the disclosed embodiments, one or more factors affecting response states of service nodes can be monitored. The multidimensional monitoring improves the comprehensiveness and scalability of service recovery.

Further, in the disclosed embodiments, an abnormal current service node is not directly initialized. Instead, a relative conservative measure is taken by stopping the current service node from communicating with backup service nodes to trigger service node switching. When a misdiagnosis incident happens, the current service node that is misdiagnosed as having the abnormal response state may then serve as a new current service node again and continuing providing the service, thereby preventing any negative influence the misdiagnosis may have on the entire system.

Figure 6:
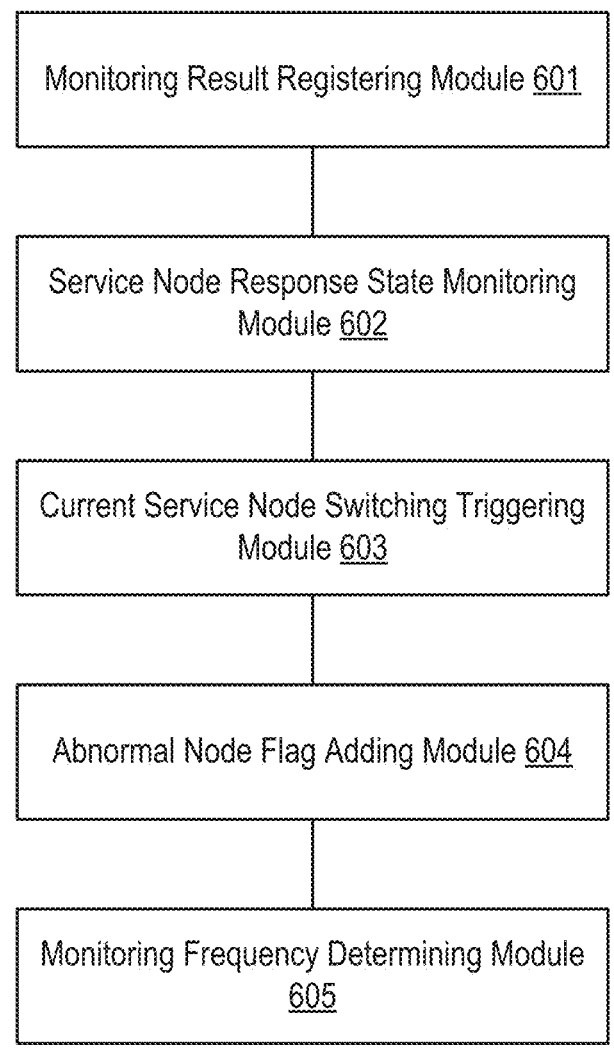
FIG. 6 is a block diagram of an apparatus for switching service nodes in a distributed storage system according to some embodiments of the disclosure.

FIG. 6 is a block diagram of an apparatus for switching service nodes in a distributed storage system according to some embodiments of the disclosure. The service nodes include a current service node and backup service nodes. The apparatus may specifically include the following modules.

A monitoring result registering module 601 is configured to register a monitoring result of at least one of the service nodes into a monitoring result registration list.

A service node response state monitoring module 602 is configured to monitor response states of the service nodes to a service request.

A current service node switching triggering module 603 is configured to do the following: if a response state of the current service node is abnormal, stop communication between the current service node and the backup service nodes, and trigger a switching process for the current service node.

An abnormal node flag adding module 604 is configured to do the following: if a response state of a certain service node is abnormal, add an abnormal node flag to the service node for marking the service node not participating in the switching process for the current service node.

A monitoring frequency determining module 605 is configured to use a result obtained by dividing the number of the multithreading by the preset response time threshold as a frequency of monitoring the response states of the service nodes.

As one example of this embodiment in the present application, the apparatus may further include the following units.

A storage unit response time determining module is configured to acquire start and end times of log writing of the storage unit of the service node through a log recording thread, and use a time interval between the start and end times as a storage unit response time;

A storage response timeout flag adding module is configured to determine whether the storage unit response time is greater than a third preset response time threshold; and if so, add the storage response timeout flag to the storage unit and record a time point (T2) when the flag is added accordingly.

A storage response timeout flag deleting module is configured to do the following: if the storage unit response time is less than the third preset response time threshold and the storage unit already includes the storage response timeout flag, delete the storage response timeout flag.

As one example of this embodiment, the current service node switching triggering module 603 may include the following submodule.

A selection triggering submodule is configured to trigger selection of at least one service node not including the abnormal node flag as a new current service node to replace the current service node having the abnormal response state.

As one example of this embodiment, the service node response state monitoring module 602 may include the following submodule.

A multithread monitoring submodule is configured to monitor the response states of the service nodes to the service request through multithreading.

As a first example of this embodiment, the multithread monitoring submodule may include the following sub-units.

A first checking thread sub-unit is configured to acquire, through a first checking thread, a time point (T1) at which the service node last fetches the service request from a service request queue, and use a time interval (D1) between a current time point (N1) and the time point (T1) as a response time; and A first preset response time threshold determining sub-unit is configured to determine whether the response time is greater than a first preset response time threshold; and if so, determine that the response state of the service node is abnormal.

As a second example of this embodiment, the multithread monitoring submodule may include the following sub-units.

A second checking thread sub-unit is configured to determine whether a storage unit of the service node includes a storage response timeout flag through a second checking thread; and if so, invoke a second preset response time threshold determining subunit.

The second preset response time threshold determining sub-unit is configured to use a time interval (D2) between a flag being added a time point (T2) corresponding to the storage response timeout flag and a current time point (N2) as the response time; and if the response time is greater than a second preset response time threshold, determining that the response state of the service node is abnormal.

As one example of this embodiment, the service node response state monitoring module 602 may include the following submodule.

A monitoring result polling submodule is configured to poll registered monitoring results at a start position of the monitoring result registration list.

In the disclosed embodiments, an abnormal node flag is added to the service node having an abnormal response state, which avoids the problem of the service node having the abnormal response state being selected as a current service node, thereby achieving the goal of service node switching. Moreover, since the abnormal service node is excluded, the service node switching process can ensure the stability of the new current service node, avoiding system fluctuation caused by repeated service node switching, and improving the stability of service recovery.

The apparatus embodiments are described relatively simply as they are basically similar to the method embodiments, and reference may be made to the descriptions in the parts of the method embodiments for relevant parts.

The embodiments of this description are described progressively, each embodiment emphasizes a part different from other embodiments, and identical or similar parts of the embodiments may be obtained with reference to each other.

Those skilled in the art should understand that, the disclosed embodiments may be provided as a method, an apparatus, or a computer program product. Therefore, the disclosed embodiments may be implemented as a complete hardware embodiment, a complete software embodiment, or an embodiment combining software and hardware. Moreover, the disclosed embodiments may be a computer program product implemented on one or more computer usable storage media (including, but not limited to, a magnetic disk memory, a CD-ROM, an optical memory, and the like) including computer usable program code.

In a typical configuration, a computer device includes one or more central processing units (CPUs), an input/output interface, a network interface, and a memory. The memory may include a computer readable medium in the form of a non-permanent memory, a random-access memory (RAM) and/or a non-volatile memory or the like, such as a read-only memory (ROM) or a flash memory (flash RAM). The memory is an example of a computer readable medium. The computer readable medium includes permanent and non-permanent, movable and non-movable media that can achieve information storage by means of any methods or techniques. The information may be computer readable instructions, data structures, modules of programs or other data. For example, a storage medium of a computer includes, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to a computing device. In light of the definitions herein, the computer readable medium does not include transitory computer readable media (transitory media), such as modulated data signals and carrier waves.

The disclosed embodiments are described with reference to flowcharts and/or block diagrams according to the method, terminal device (system) and computer program product of the disclosed embodiments. A computer program instruction may be used to implement each process and/or block in the flowcharts and/or block diagrams and combinations of processes and/or blocks in the flowcharts and/or block diagrams. These computer program instructions may be provided to a general-purpose computer, a special-purpose computer, an embedded processor, or a processor of any other programmable data processing terminal device to generate a machine, so that the instructions executed by a computer or a processor of any other programmable data processing terminal device generate an apparatus for implementing a specified function in one or more processes in the flowcharts and/or in one or more blocks in the block diagrams.

These computer program instructions may also be stored in a computer readable memory that can instruct the computer or any other programmable data processing device to work in a particular manner, such that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or any other programmable data processing terminal device, such that a series of operation steps are performed on the computer or any other programmable terminal device, thereby generating computer-implemented processing. Therefore, the instructions executed on the computer or any other programmable terminal device provide steps for implementing a specified function in one or more processes in the flowcharts and/or in one or more blocks in the block diagrams.

Exemplary embodiments have been described; however, once knowing basic creative concepts, those skilled in the art can make other variations and modifications on these embodiments. Therefore, the appended claims are intended to be interpreted as including the exemplary embodiments and all variations and modifications falling within the scope of the disclosed embodiments.

Finally, it should be further noted that, in this text, the relation terms such as first and second are merely used to distinguish one entity or operation from another entity or operation, and do not require or imply that the entities or operations have this actual relation or order. Moreover, the terms "include", "comprise" or other variations thereof are intended to cover non-exclusive inclusion, so that a process, a method, an article or a terminal device including a series of elements not only includes the elements, but also includes other elements not clearly listed, or further includes inherent elements of the process, method, article or terminal device. In a case without any more limitations, an element defined by "including a/an . . . " does not exclude that the process, method, article or terminal device including the element further has other identical elements.

A method for switching service nodes in a distributed storage system and an apparatus for switching service nodes in a distributed storage system provided in the disclosed embodiments are introduced in detail above. The principles and implementations of the disclosure are set forth herein with reference to specific examples. The above descriptions of the embodiments are merely served to help in understanding the method and essential ideas of the disclosure; and to those of ordinary skill in the art, changes may be made to specific implementations and application scopes according to the ideas of the disclosure. In view of the above, the disclosed embodiments should not be construed as limiting the disclosure.

What is claimed is:

1. A method comprising:
    initializing, by a storage system, at least one checking thread;
    issuing, by the storage system via the checking thread, service requests to a plurality of service nodes, the service nodes including a current service node and one or more backup service nodes;
    storing, by the storage system, responses to the service requests in a service request queue;
    monitoring, by the storage system, response states of a plurality of service nodes by analyzing the service request queue to identify response abnormalities;
    halting, by the storage system, communication between the current service node and the backup service nodes in response to detecting an abnormal response state of the current service node; and
    triggering, by the storage system, a switching process for the current service node, the switching process comprising replacing the current service node with a service node selected from the backup service nodes.

2. The method of claim 1, the initializing, by the storage system, at least one checking thread comprising initializing a plurality of checking threads each checking thread associated with checkpoints associated with a response state.

3. The method of claim 1, the initializing at least one checking thread comprising initializing, by the storage system, a lightweight thread, the lightweight thread prevented from performing computationally-intensive operations.

4. The method of claim 1, the halting communication between the current service node and the backup service nodes comprising one or more of:
    halting, by the storage system, heartbeat acknowledgements between the current service node and the backup service nodes;
    releasing, by the storage system, a lock held by the current service node; and
    assigning, by the storage system, an abnormal flag to the current service node.

5. The method of claim 1, the replacing the current service node with a service node selected from the backup service nodes comprising replacing, by the storage system, the current switching service node with a service node selected from the backup service nodes using a Paxos protocol.

6. The method of claim 1, the monitoring response states further comprising:
    storing, by the storage system, a monitoring result corresponding the response states in a monitoring result registration list; and
    polling, by a background thread executed by the storage system, the monitoring result registration list.

7. The method of claim 6, the polling the monitoring result registration list comprising polling, by the storage system, the monitoring result registration list at a predefined interval, the predefined interval shorter than a preset response time threshold for monitoring the response states.

8. The method of claim 1, the monitoring response states further comprising:
    acquiring, through a first checking thread executed by the storage system, a time point (T1) at which a service node last fetches the service request from the service request queue;
    using, by the first checking thread executed by the storage system, a time interval (D1) between a current time point (N1) and the time point (T1) as a response time; and
    determining, by the first checking thread executed by the storage system, that the response state of the service node is abnormal if the response time is greater than a first preset response time threshold.

9. The method of claim 8, the monitoring response states further comprising:
    determining, through a second checking thread executed by the storage system, that a storage unit of the service node includes a storage response timeout flag;

using, by the storage system, a time interval (D2) between a flag-adding time point (T2) corresponding to the storage response timeout flag and a current time point (N2) as the response time; and determining, by the storage system, that the response state of the service node is abnormal if the response time is greater than a second preset response time threshold.

10. The method of claim 9, wherein, prior to the monitoring response states, the method further comprises:

acquiring, through a log recording thread executed by the storage system, start and end times of log writing of the storage unit of the service node;

using, by the storage system, a time interval between the start and end times as a storage unit response time;

adding, by the storage system, the storage response timeout flag to the storage unit; and recording, by the storage system, a time point (T2) when the flag is added if the storage unit response time is greater than a third preset response time threshold.

11. An apparatus comprising:

a processor; and a storage medium for tangibly storing thereon program logic for execution by the processor, the stored program logic comprising:

logic, executed by the processor, for initializing at least one checking thread;

logic, executed by the processor, for issuing, via the checking thread, service requests to a plurality of service nodes, the service nodes including a current service node and one or more backup service nodes;

logic, executed by the processor, for storing responses to the service requests in a service request queue;

logic, executed by the processor, for monitoring response states of a plurality of service nodes by analyzing the service request queue to identify response abnormalities;

logic, executed by the processor, for halting communication between the current service node and the backup service nodes in response to detecting an abnormal response state of the current service node; and logic, executed by the processor, for triggering a switching process for the current service node, the switching process comprising replacing the current service node with a service node selected from the backup service nodes.

12. The apparatus of claim 11, the logic for initializing the at least one checking thread comprising logic, executed by the processor, for initializing a plurality of checking thread, each checking thread associated with checkpoints associated with a response state.

13. The apparatus of claim 11, the logic for initializing at least one checking thread comprising logic, executed by the processor, for initializing a lightweight thread, the lightweight thread prevented from performing computationally-intensive operations.

14. The apparatus of claim 11, the logic for halting communication between the current service node and the backup service nodes comprising one or more of:

logic, executed by the processor, for halting heartbeat acknowledgements between the current service node and the backup service nodes;

logic, executed by the processor, for releasing a lock held by the current service node; and logic, executed by the processor, for assigning an abnormal flag to the current service node.

15. The apparatus of claim 11, the logic for replacing the current service node with a service node selected from the backup service nodes comprising logic, executed by the processor, for replacing the current service node with a service node selected from the backup service nodes using a Paxos protocol.

16. The apparatus of claim 11, the logic for monitoring response states further comprising:

logic, executed by the processor, for storing a monitoring result corresponding the response states in a monitoring result registration list; and logic, executed by the processor, for polling, via a background thread, the monitoring result registration list.

17. The apparatus of claim 16, the logic for polling the monitoring result registration list comprising logic, executed by the processor, for polling the monitoring result registration list at a predefined interval, the predefined interval shorter than a preset response time threshold for monitoring the response states.

18. The apparatus of claim 11, the logic for monitoring response states further comprising:

logic, executed by the processor, for acquiring, through a first checking thread, a time point (T1) at which a service node last fetches the service request from the service request queue;

logic, executed by the processor, for using, by the first checking thread, a time interval (D1) between a current time point (N1) and the time point (T1) as a response time; and logic, executed by the processor, for determining, by the first checking thread, that the response state of the service node is abnormal if the response time is greater than a first preset response time threshold.

19. The apparatus of claim 18, the logic for monitoring response states further comprising:

logic, executed by the processor, for determining, through a second checking thread, that a storage unit of the service node includes a storage response timeout flag;

logic, executed by the processor, for using a time interval (D2) between a flag-adding time point (T2) corresponding to the storage response timeout flag and a current time point (N2) as the response time; and logic, executed by the processor, for determining that the response state of the service node is abnormal if the response time is greater than a second preset response time threshold.

20. The apparatus of claim 19, wherein, prior to executing the logic for monitoring response states, the logic further comprises:

logic, executed by the processor, for acquiring, through a log recording thread, start and end times of log writing of the storage unit of the service node;

logic, executed by the processor, for using a time interval between the start and end times as a storage unit response time;

logic, executed by the processor, for adding the storage response timeout flag to the storage unit; and logic, executed by the processor, for recording a time point (T2) when the flag is added if the storage unit response time is greater than a third preset response time threshold.

* * * * *